3,300,527
ACRYLONITRILE SYNTHESIS
Thomas C. Bissot, Grand Island, N.Y., assignor to E. I. du Pont de Nemours and Company, Wilmington, Del., a corporation of Delaware
No Drawing. Filed Oct. 31, 1963, Ser. No. 320,515
2 Claims. (Cl. 260—465.3)

This invention relates to the production of acrylonitrile by the reaction of hydrogen cyanide and acetylene in a substantially anhydrous liquid catalyst medium. More particularly, this invention relates to the production of acrylonitrile with an anhydrous catalyst composition in a lower temperature range than heretofore found practical by the selection of specific nitrile solvents for the catalyst and the utilization of critical process variables.

Patent 2,920,098, assigned to my assignee, discloses a process for the formation of acrylonitrile from hydrogen cyanide and acetylene with an anhydrous catalyst system that offers a number of important advantages over aqueous cuprous chloride catalytic systems. The activity of the catalyst system of this improved process was shown to increase with an increase in the temperature of reaction and an increase in the concentration of cuprous chloride present therein, so that it was considered necessary to operate at temperatures of at least 100° C. to insure effective catalyst activity for the production of acrylonitrile. Moreover, for various of the solvents including those indicated as preferred for acrylonitrile synthesis in Patent 2,920,098, operation above 90° C. is essential to maintain the catalyst composition as a homogeneous liquid since below this temperature a complex which forms between the solvent and the copper salts present sets up in part as a solid. Operation at temperatures above that required to maintain the catalyst system liquid is necessary because the removal of the heat of reaction is accomplished by vaporization of solvent. Even though operating temperatures above 90° C. and usually in excess of 100° C. were considered essential as a practical matter for the above reasons, it was recognized that operation under such conditions of temperature involved definite disadvantages. The chief disadvantage is that as reaction temperature increases there is a dramatic increase in the formation of tarry by-products representing a loss in yield and a problem to continuous operation. A further disadvantage is that as reaction temperature increases the removal of heat of reaction and control of reaction temperature becomes increasingly more difficult and costly.

It is, accordingly, a major object of this invention to provide an improved low temperature process for the production of acrylonitrile from hydrogen cyanide and acetylene catalyzed by an anhydrous catalyst composition which results in better removal of heat of reaction and lower tar formation over previously recommended operations at substantially higher temperatures without any sacrifice in acrylonitrile productivity.

These and other objects are accomplished by a process comprising passing hydrogen cyanide and an excess of acetylene into an anhydrous catalytic composition containing at least 45% by weight of an admixture of cuprous chloride and cuprous cyanide wherein the ratio of cuprous chloride to cuprous cyanide is in a range of from 1.5:1 to 4:1, dissolved in a solvent selected from the group consisting of acrylonitrile and propionitrile, said composition being maintained on the acid side and in a temperature range of from about 65–85° C.

It has been found in accordance with the present invention that within the process temperature range of 65–85° C. acrylonitrile and propionitrile exhibit a surprising solubility for the catalytic copper salts permitting an increase in the concentration of copper salts in the catalyst composition which more than offsets any loss in catalytic activity occasioned by lower operating temperatures. Utilization of this finding to attain a concentration of copper salts of at least 45% by weight based on the catalyst composition in conjunction with maintaining the copper salts in solution in the catalyst composition as an admixture of cuprous chloride and cuprous cyanide in which the ratio of cuprous chloride to cuprous cyanide is held in the range of from 1.5:1 to 4:1 provides in accordance with the invention a catalyst activity at temperatures in range of 65–85° C. which previously was considered possible only at temperatures in excess of 100° C. The maintenance of the ratio of cuprous chloride to cuprous cyanide in the catalyst solution within the range specified above is found to be critical for high catalyst activity by insuring maximum solubility of copper salts in the solvent and preventing the formation of undesired by-products. Preferably, the catalyst composition for purposes of the process of the invention contains from 55–65% by weight of an admixture of cuprous chloride and cuprous cyanide in which the ratio of cuprous chloride to cuprous cyanide is held in the range of from 2:1 to 3:1.

The catalyst system for the process of the invention must be maintained on the acid side. This may be conveniently accomplished by continuous addition of a small amount of dry hydrogen chloride along with the reactant gases. The amount of hydrogen chloride should be no less than about 0.01% of the weight of the hydrogen cyanide used and may be as high as 10%. It is preferred to add about 1–5% by weight of HCl to HCN making the addition continuously with the gas feed to the reactor.

The use of acrylonitrile as the solvent for the catalyst system in the process of the invention is particularly preferred since it eliminates the need for an extra solvent in the process and makes it possible to approach or attain isothermal operation whereby little or no heat need be added or removed during reaction. It is particularly surprising that acrylonitrile can be so effectively employed as the solvent in the anhydrous catalyst system due to its known tendency to polymerize. It is believed that this tendency toward polymerization is suppressed by the acidic nature of the catalyst system in operation which acidic nature, as discussed above, is essential for other considerations. If the catalyst solution is to be made up and stored for any prolonged period before use in the process of the invention, it is preferred to add small amounts of hydrogen cyanide to the catalyst composition during its make-up which is found to effectively inhibit polymerization of the acrylonitrile and its interreaction with the cuprous chloride salt present in the catalyst composition.

The catalyst composition for the process of the invention may also contain other ingredients known to the art such as promoters and activators in such amounts as required to function in an anticipated manner to increase catalytic activity and thereby give improved results. Particularly suited for use in the catalyst composition are carboxamide compounds, such as disclosed and claimed in U.S. Patent 2,999,072, as catalyst promoters. Such promoters are best employed in an amount of from about 4–8% by weight of the catalyst solution.

The following examples illustrate the principles underlying the present invention by showing embodiments within as well as outside the invention. All percentages are by weight unless otherwise indicated. In all the examples, the catalyst system is promoted with dimethylformamide, a preferred carboxamide catalytic promoter. It is to be understood, however, that such a promoter is not essential for the process of the invention or the improve-

Example 1

A catalyst composition was prepared containing 50% cuprous chloride, 15% cuprous cyanide (a CuCl to CuCN ratio of 3.33:1), 5% dimethylformamide, and 30% acrylonitrile. This catalyst system was maintained in a reactor in the temperature range of from 65–75° C. Acetylene was fed to the catalyst at the rate of 4.8 liters of gas/liter catalyst/min. The flow of hydrogen cyanide gas to catalyst was adjusted so that approximately 0.1 to 1 mole percent hydrogen cyanide was present in the product stream. Throughout the experiment anhydrous hydrogen chloride was fed to the catalyst in an amount equal to about 0.07 volume percent of the acetylene flow. The experiment involved 71 hours of continuous operation during which time the catalyst exhibited an average productivity of 90 lbs. of acrylonitrile/day/ft.$^3$ of catalyst.

Example 2

A catalyst composition was prepared which contained 45% cuprous chloride, 20% cuprous cyanide (CuCl:CuCN of 2.25:1), 8% dimethylformamide, and 27% acrylonitrile. The catalyst system was maintained at a temperature of 70° C. Acetylene and hydrogen cyanide were fed to the catalyst in a mole ratio of 20:1 for a run which was conducted continuously for 8 hours. In this experiment no anhydrous hydrogen chloride was fed to the catalyst. The catalyst productivity remained at a high level throughout the experiment averaging a productivity of 107 lbs. of acrylonitrile/day/ft.$^3$ of catalyst.

Example 3

A catalyst composition was prepared which contained 60% cuprous chloride, 15% cuprous cyanide (CuCl:CuCN of 2.25:1), 8% dimethylformamide, and 17% acrylonitrile. The catalyst system was maintained at a temperature of 70° C. Acetylene and hydrogen cyanide were fed to the catalyst in a mole ratio of 10:1. The total gas flow was adjusted so that approximately .25 volume percent hydrogen cyanide was present in the product gas stream. The experiment involved one hour continuous operation during which the catalyst exhibited an average productivity of 170 lbs. of acrylonitrile/day/ft.$^3$ of catalyst.

Example 4

A catalyst composition was prepared containing 45% cuprous chloride, 20% cuprous cyanide (CuCl:CuCN of 2.25:1), 15% dimethylformamide, and 20% acrylonitrile. This catalyst system was maintained in a reactor at the temperature of 75° C. while acetylene was fed to the catalyst at a rate of 5 liters/liter catalyst/min. for a run involving 10 hours of continuous operation. The flow of hydrogen cyanide gas was adjusted so that approximately 0.4% hydrogen cyanide was present in the product gas stream. Throughout the experiment anhydrous hydrogen chloride was fed to the catalyst in an amount equal to 4% of the hydrogen cyanide. The catalyst exhibited an average productivity during this run of 140 lbs. of acrylonitrile/day/ft.$^3$ of catalyst.

Example 5

A catalyst composition was prepared which contained 40% cuprous chloride, 15% cuprous cyanide (CuCl:CuCN of 2.66:1), 25% dimethylformamide, and 20% acrylonitrile. The catalyst was maintained in a reactor at the temperature of 80° C. while acetylene was fed to the catalyst at a rate of 5 liters/liter catalyst/min. for an experiment which involved 5 hours of continuous operation. The flow of hydrogen cyanide gas was adjusted so that approximately 0.4% hydrogen cyanide was present in the product gas stream. In this experiment no anhydrous hydrogen chloride was fed to the catalyst. Under these conditions, the catalyst exhibited an average productivity of 100 lbs. of acrylonitrile/day/ft.$^3$ of catalyst.

Example 6

A catalyst composition was prepared which contained 65% copper salts as an admixture of 45% cuprous chloride and 20% cuprous cyanide (CuCl:CuCN of 2.25:1), and 8% dimethylformamide, and 28% acrylonitrile. This catalyst was operated in a reactor at 80° C. as in Example 5. Acetylene was fed to the catalyst at a rate of 5 liters/liter catalyst/min. The flow of hydrogen cyanide gas was adjusted so that approximately 0.4% hydrogen cyanide was present in the product gas stream. Throughout the experiment anhydrous hydrogen chloride was fed to the catalyst in an amount equal to about 4% of the hydrogen cyanide. The experiment was conducted continuously for 50 hours during which time the catalyst exhibited an average productivity of 120 lbs. of acrylonitrile/day/ft.$^3$ of catalyst.

Example 7

A catalyst composition was prepared containing 45% cuprous chloride, 20% cuprous cyanide (CuCl:CuCN of 2.25:1), 25% dimethylformamide, and 10% acrylonitrile. This catalyst was maintained in a reactor at a temperature of 85° C. while acetylene was fed to the catalyst at a rate of 5 liters/liter catalyst/min. during a run involving 48 hours of continuous operation. The flow of hydrogen cyanide gas was adjusted so that approximately 0.4% hydrogen cyanide was present in the product gas stream. In this experiment no anhydrous hydrogen chloride was fed to the catalyst. During this experiment, the catalyst exhibited an average productivity of 140 lbs. of acrylonitrile/day/ft. of catalyst.

Example 8

A catalyst composition was prepared which contained 35% cuprous chloride, 25% cuprous cyanide (CuCl:CuCN of 1.4:1)

8% dimethylformamide, and 32% acrylonitrile. This catalyst was maintained in a reactor at a temperature of 75° C. while acetylene was fed to the catalyst at a rate of 5 liters/liter catalyst/min. which involved 69 hours of continuous operation. The flow of hydrogen cyanide gas was adjusted so that approximately 0.4% hydrogen cyanide was present in the product gas stream. In this experiment no anhydrous hydrogen chloride was fed to the catalyst. Under these conditions which fall outside the range of CuCl:CuCN of from 1.5:1 to 4:1 appropriate for the invention, the catalyst exhibited a productivity which averaged only 76 lbs. of acrylonitrile/day/ft.$^3$ of catalyst even through the total amount of copper salts was comparable to that of Examples 1–7.

Example 9

A catalyst composition was prepared containing 55% cuprous chloride, 10% cuprous cyanide (CuCl:CuCN of 5.5:1), 5% dimethylformamide, and 30% acrylonitrile. The copper salts were not completely dissolved in this composition. The catalyst was maintained in a reactor at a temperature of 70° C. while acetylene was fed to the catalyst at a rate of 4.8 liters/liter catalyst/min. during a run of 32 hours' duration. The HCN gas flow was adjusted so that approximately 0.3% hydrogen cyanide was present in the product gas stream. Throughout this experiment, anhydrous HCl gas was fed to the catalyst in an amount equal to 4–5% of the hydrogen cyanide. During this experiment, the catalyst exhibited an average productivity of 60 lbs. of acrylonitrile/day/ft.$^3$ of catalyst. With this composition, which falls outside of the CuCl:CuCN range of from 1.5:1 to 4:1 appropriate for the invention, a considerably larger percentage of by-product vinyl chloride was observed than in the previous Examples 1 to 8.

As may be noted from the above examples, the ratio of acetylene to the hydrogen cyanide in the feed gas passed into the catalyst composition may be varied over a wide range. Ratios of acetylene to hydrogen cyanide of from 25:1 to 2:1 are found suitable. At higher ratios the recycling of excess acetylene becomes prohibitively expensive. At lower ratios, the acrylonitrile is not swept out of the catalyst efficiently. The preferred ratio of these reactant gases is 15:1 to 6:1.

Since many different embodiments of the invention may be made without departing from the spirit and scope thereof, it is to be understood that the invention is not limited by the specific illustrations except to the extent defined in the following claims.

I claim:

1. The process for making acrylonitrile comprising passing hydrogen cyanide and an excess of acetylene into an anhydrous catalyst composition consisting essentially of from 45% to 65% by weight of an admixture of cuprous chloride and cuprous cyanide, wherein the ratio of cuprous chloride to cuprous cyanide is in a range of from 1.5:1 to 4:1, dissolved in acrylonitrile; said catalyst composition being maintained on the acid side by addition of hydrochloric acid and in a temperature range of from 65 to 85° C.

2. The process for making acrylonitrile comprising passing hydrogen cyanide and acetylene in a mole ratio of about 1:6 to 1:15 into an anhydrous catalyst composition consisting essentially of from 55 to 65% by weight of an admixture of cuprous chloride and cuprous cyanide, wherein the ratio of cuprous chloride to cuprous cyanide is in a range of from 2:1 to 3:1, dissolved in acrylonitrile, and from 4 to 8% by weight of a carboxamide catalyst promoter; while maintaining said catalyst composition on the acid side by addition of 0.01% to 10% hydrochloric acid based on the weight of said hydrogen cyanide and in a temperature range of from 65 to 80° C.

References Cited by the Examiner

UNITED STATES PATENTS

| | | | |
|---|---|---|---|
| 2,999,072 | 9/1961 | Rowbottom | 252—429 |
| 2,999,073 | 9/1961 | Harris | 252—429 |
| 3,053,881 | 9/1962 | Kremer et al. | 260—465.3 |
| 3,114,764 | 12/1963 | Rowbottom | 260—465.3 |
| 3,189,642 | 6/1965 | Baker | 260—465.3 |

CHARLES B. PARKER, *Primary Examiner.*

JOSEPH P. BRUST, *Assistant Examiner.*